(12) United States Patent
Elnozahy et al.

(10) Patent No.: US 8,381,004 B2
(45) Date of Patent: Feb. 19, 2013

(54) OPTIMIZING ENERGY CONSUMPTION AND APPLICATION PERFORMANCE IN A MULTI-CORE MULTI-THREADED PROCESSOR SYSTEM

(75) Inventors: Elmootazbellah N. Elnozahy, Austin, TX (US); Heather L. Hanson, Austin, TX (US); Freeman L. Rawson, III, Austin, TX (US); Malcolm S. Ware, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 443 days.

(21) Appl. No.: 12/787,842

(22) Filed: May 26, 2010

(65) Prior Publication Data

US 2011/0296212 A1    Dec. 1, 2011

(51) Int. Cl.
*G06F 1/32* (2006.01)
(52) U.S. Cl. ........ 713/321; 713/320; 713/322; 713/323; 718/105
(58) Field of Classification Search .......... 713/320–323; 718/105
See application file for complete search history.

(56) References Cited

U.S. PATENT DOCUMENTS

| | | | |
|---|---|---|---|
| 7,146,514 B2 | 12/2006 | Kaushik et al. | |
| 7,152,170 B2 | 12/2006 | Park | |
| 7,600,135 B2 | 10/2009 | Jones | |
| 7,669,204 B2 | 2/2010 | Moilanen et al. | |
| 7,694,160 B2 * | 4/2010 | Esliger et al. | 713/320 |
| 8,122,269 B2 * | 2/2012 | Houlihan et al. | 713/320 |
| 2003/0217090 A1 | 11/2003 | Chauvel et al. | |
| 2004/0215987 A1 * | 10/2004 | Farkas et al. | 713/300 |
| 2006/0212677 A1 * | 9/2006 | Fossum | 712/1 |
| 2007/0162911 A1 * | 7/2007 | Kohn et al. | 718/107 |
| 2008/0263324 A1 * | 10/2008 | Sutardja et al. | 712/43 |
| 2009/0064164 A1 | 3/2009 | Bose et al. | |
| 2009/0249094 A1 | 10/2009 | Marshall et al. | |
| 2010/0153956 A1 | 6/2010 | Capps, Jr. et al. | |
| 2010/0299541 A1 * | 11/2010 | Ishikawa et al. | 713/300 |

OTHER PUBLICATIONS

USPTO U.S. Appl. No. 13/416,583.
"Power-aware VM scheduling in a Cloud data center", Disclosed Anonymously, www.ip.com, IPCOM000196870D, Jun. 18, 2010, 3 pages.
Ahmad, Ishfaq et al., "Using Game Theory for Scheduling Tasks on Multi-Core Processors for Simultaneous Optimization of Performance and Energy", Proceedings of the 22nd IEEE International Parallel and Distributed Processing Symposium, (IPDPS'08), Miami, Florida, 2008, 6 pages.

(Continued)

*Primary Examiner* — Thuan Du
(74) *Attorney, Agent, or Firm* — Francis Lammes; Stephen J. Walder, Jr.; Eustus D. Nelson

(57) ABSTRACT

A mechanism is provided for scheduling application tasks. A scheduler receives a task that identifies a desired frequency and a desired maximum number of competing hardware threads. The scheduler determines whether a user preference designates either maximization of performance or minimization of energy consumption. Responsive to the user preference designating the performance, the scheduler determines whether there is an idle processor core in a plurality of processor cores available. Responsive to no idle processor being available, the scheduler identifies a subset of processor cores having a smallest load coefficient. From the subset of processor cores, the scheduler determines whether there is at least one processor core that matches desired parameters of the task. Responsive to at least one processor core matching the desired parameters of the task, the scheduler assigns the task to one of the at least one processor core that matches the desired parameters.

16 Claims, 9 Drawing Sheets

OTHER PUBLICATIONS

Bathen, Luis Angel D. et al., "A Methodology for Power-aware Pipelining via High-Level Performance Model Evaluations", 10th International Workshop on Microprocessor Test and Verification, Austin, Texas, Dec. 7-9, 2009, pp. 19-24.

Etinski, Maja et al., "BSLD Threshold Driven Power Management Policy for HPC Centers", Proceedings of the 2010 IEEE International Symposium on Parallel and Distributed Processing, Workshops and Phd Forum (IPDPSW'2010), Atlanta, Georgia, Apr. 19-23, 2010, 8 pages.

Papa, Abu S. et al., "Power Management of Variation Aware Chip Multiprocessors", GLSVLSI'08, Orlando, Florida, May 4-6, 2008, 6 pages.

* cited by examiner

OPTIMIZING ENERGY CONSUMPTION AND APPLICATION PERFORMANCE IN A MULTI-CORE MULTI-THREADED PROCESSOR SYSTEM

BACKGROUND

The present application relates generally to an improved data processing apparatus and method and more specifically to mechanisms for optimizing energy consumption and application performance while scheduling tasks in a multi-core multi-threaded processor system.

Modern data processing systems typically include a plurality of processor cores. In some modern data processing systems, each processor core is multithreaded where multiple hardware-supported threads could be executing in parallel within the processor core. The number of threads depends on the design of the processor core, and usually presents a tradeoff between efficient utilization of processor core resources on one hand, and the requirements on the pipeline, cache size, and memory bandwidth on the other hand.

In these data processing systems, operating system software typically decides the assignment of application tasks to the various hardware threads available. Depending on the workload, the user or system administrator may also instruct the operating system to use only a specific number of hardware threads within a particular processor core to run particular application tasks, leaving the remaining hardware threads idle. However, tuning performance is not the only consideration for scheduling application processes on the available hardware threads. Energy consumption is another important consideration. In processors that allow the user to use dynamic voltage and frequency scaling (DVFS), the selection of the frequency of each processor core enables the user to fine-tune the tradeoff between performance and energy consumption.

The problem is how to schedule application tasks on the available processor cores and hardware threads so as to get the best tradeoff among application's individual performance and energy consumption.

SUMMARY

In one illustrative embodiment, a method, in a data processing system, is provided for scheduling application tasks. The illustrative embodiment receives a task that identifies a desired frequency and a desired maximum number of competing hardware threads. The illustrative embodiment determines whether a user preference designates either maximization of performance or minimization of energy consumption. The illustrative embodiment determines whether there is an idle processor core in a plurality of processor cores available in response to the user preference designating the performance. The illustrative embodiment identifies a subset of processor cores having a smallest load coefficient in response to no idle processor being available, From the subset of processor cores, the illustrative embodiment determines whether there is at least one processor core that matches desired parameters of the task. The illustrative embodiment assigns the task to one of the at least one processor core that matches the desired parameters in response to at least one processor core matching the desired parameters of the task.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
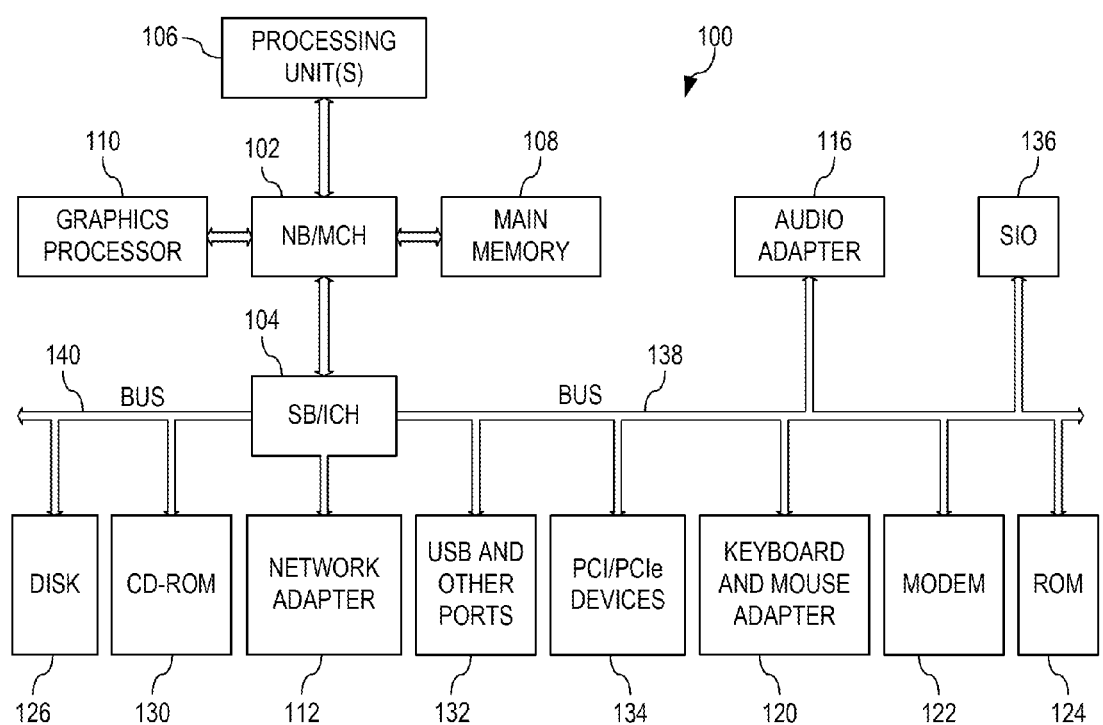
FIG. 1 shows an exemplary data processing system in which aspects of the illustrative embodiments may be implemented.

The illustrative embodiments provide a mechanism for scheduling application tasks while giving the best tradeoff possible among system throughput, application performance, and energy consumption. Again, operating system software typically decides the assignment of application tasks to the various hardware threads available. Depending on the workload, the user or system administrator may instruct the operating system to use only a specific number of hardware threads within a particular processor core to run particular application tasks, leaving the remaining hardware threads idle. However, varying the number of active hardware threads allows the user or system administrator to fine-tune the tradeoff between resource utilization within a processor core and the competition among the hardware threads for cache memory and memory bandwidth, depending on the workload characteristics. For instance, if the application software has good memory reference locality and the application is performance sensitive, the user or system administrator may assign only one thread to run the application task so that the impact of competition on the cache memory and memory bandwidth is eliminated. This gives the maximum performance for the application. On the other hand, if the application's software does not have good memory reference locality, assigning only one thread to this application wastes processor core resources and yields no performance improvement for the application since the application is likely to spend many cycles stalling for data access from the main memory bank.

In this case, a better arrangement is to group multiple of these application tasks and run them unto the hardware threads of one processor core, which will yield better throughput performance and high utilization of the processor core resources. The resulting performance degradation due to competition for cache size and memory bandwidth will likely be minimal. The exact number of threads that should be assigned to application tasks depends on the workload mix available and the desired performance for each workload. Therefore, for each application task, there is a desired maximum number of competing threads that may be running simultaneously within the processor core to provide the best tradeoff between the individual task's performance and system throughput.

Tuning performance is not the only consideration for scheduling application processes on the available hardware threads. Energy consumption is another important consideration. There may be a desire to run a particular workload to obtain the desired performance while minimizing the energy used. Or, there may be a desire to run a particular workload within a fixed energy budget while maximizing performance. The tradeoff between energy and performance is generally difficult and depends on the server system, application workload, and the user's expectation of performance and energy consumption. An element of this tradeoff is the frequency at which the application task should run. Generally, for applications that have good memory reference locality and are well tuned for the underlying processor architecture, the performance improves with increased frequency of the processor core. On the other hand, for applications that have poor memory reference locality, increasing the frequency may not yield substantial improvements in performance since the application is likely to be stalling frequently waiting for data from the memory. Therefore, for each application task, there is a certain frequency that defines the best tradeoff between energy and performance.

In processors that allow dynamic voltage and frequency scaling (DVFS). the selection of the frequency of each processor core enables the user to fine-tune the tradeoff between performance and energy consumption. However, the minimum unit for frequency selection is a processor core. Thus, all threads running in that processor core will have to run at the chosen frequency. Furthermore, the processor core usually has associated with it a number of designated frequencies at which it may be set. These aspects represent a difficult problem for scheduling independent tasks on multithreaded processor cores. For example, an application task may not find a processor core that is running at its desired frequency, and thus may settle for sharing the processor core with other application tasks all running at frequencies that are hopefully close but cannot be identical to their desired frequencies.

The discussion thus far helps formulate the problem in scheduling applications on a multi-core processor with multithreaded processor cores:

Given:

A processor with C cores, each capable of running T hardware threads.

Each processor core may be set to run at a frequency chosen from a range of discrete frequencies $f_1, f_2, \ldots, f_m$ where fm designates the maximum frequency at which the processor core may function. The voltage of the processor core is adjusted with the frequency such that $f_1$ corresponds to operating at the minimum power consumption, while $f_m$ corresponds to operating at the maximum power consumption.

A processor core frequency may be set to 0, in which case the processor core is idle and may be put to sleep to save energy.

There is an application mix, such that each application task has associated with it a desired frequency $f_a$ and a desired maximum number of competing threads $t_a$ that specifies the maximum number of threads that may be running on the processor core without seriously degrading the individual performance of each application. Increasing the number of threads beyond $t_a$ will lead to serious performance degradation.

The problem is how to schedule application tasks on the available processor cores and hardware threads so as to get the best tradeoff among application's individual performance and energy consumption.

Figure 2:
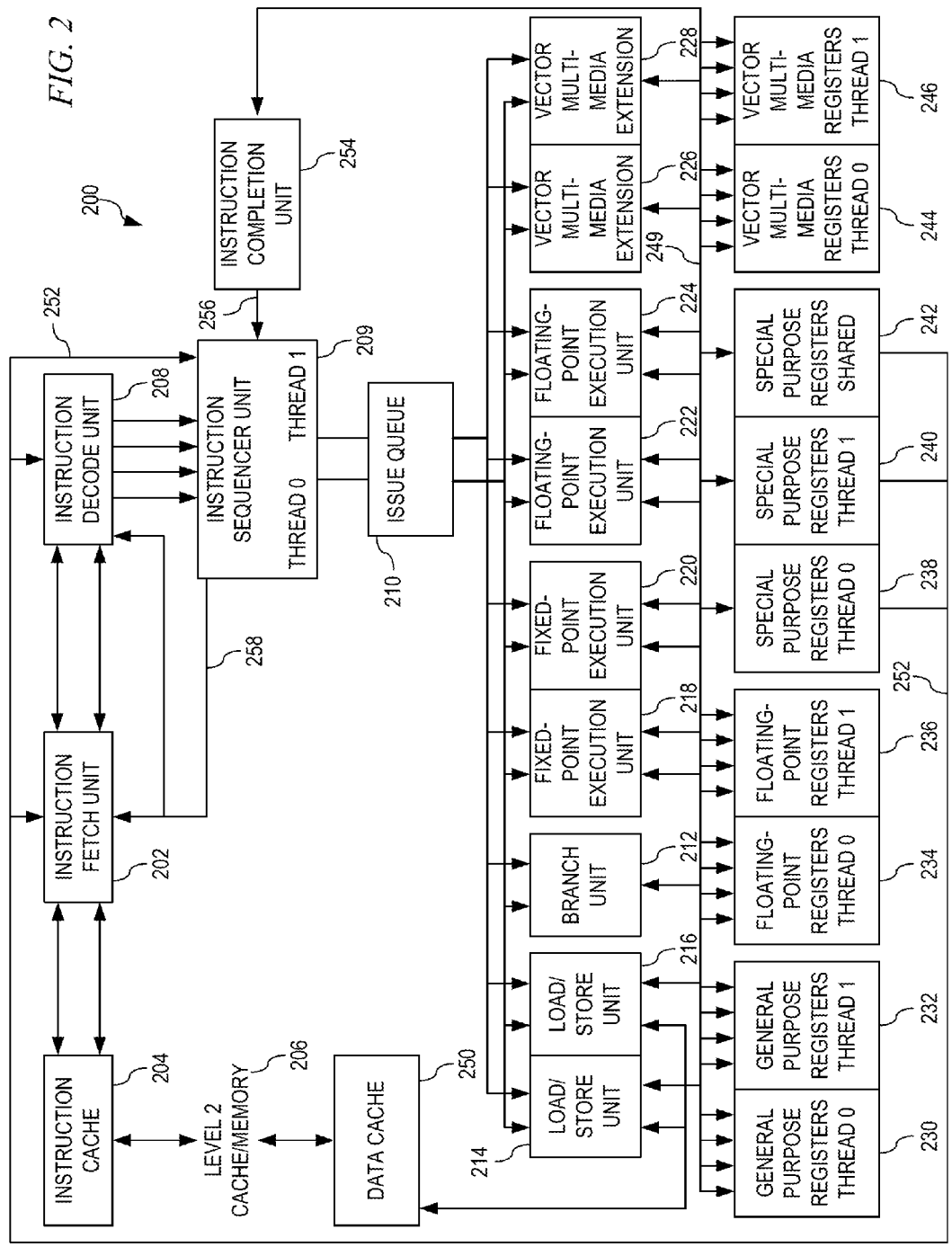
FIG. 2 depicts an exemplary block diagram of a dual-threaded processor core design showing functional units and registers in accordance with an illustrative embodiment.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a single data processing device implementation for scheduling tasks in a data processing system with user-specified optimization criterion chosen from either individual application performance or system energy consumption, this is only an example and is not intended to state or imply any limitation with regard to the features of the present invention, To the contrary, the illustrative embodiments are intended to include distributed data processing environments and embodiments in which tasks may be scheduled using user-specified optimization criterion chosen from either individual application performance or system energy consumption.

With reference now to the figures and in particular with reference to FIGS. 1-2, example diagrams of data processing environments are provided in which illustrative embodiments of the present invention may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to FIG. 1, an exemplary data processing system is shown in which aspects of the illustrative embodiments may be implemented. Data processing system 100 is an example of a computer in which computer-usable code or instructions implementing the processes for illustrative embodiments of the present invention may be located.

In the depicted example, data processing system 100 employs a hub architecture including north bridge and memory controller hub (NB/MCH) 102 and south bridge and input/output (I/O) controller hub (SB/ICH) 104. Processing unit 106, main memory 108, and graphics processor 110 are connected to NB/MCH 102. Graphics processor 110 may be connected to NB/MCH 102 through an accelerated graphics port (AGP).

In the depicted example, local area network (LAN) adapter 112 connects to SB/ICH 104. Audio adapter 116, keyboard and mouse adapter 120, modem 122, read only memory (ROM) 124, hard disk drive (HDD) 126, CD-ROM drive 130, universal serial bus (USB) ports and other communication ports 132, and PCI/PCIe devices 134 connect to SB/ICH 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash basic input/output system (BIOS).

HDD 126 and CD-ROM drive 130 connect to SB/ICH 104 through bus 140. HDD 126 and CD-ROM drive 130 may use, for example, an integrated drive electronics (IDE) or serial advanced technology attachment (SATA) interface. Super 110 (510) device 136 may be connected to SB/ICH 104.

An operating system runs on processing unit 106. The operating system coordinates and provides control of various components within the data processing system 100 in FIG. 1. As a client, the operating system may be a commercially available operating system such as Microsoft® Window® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 100 (Java is a trademark of Sun Microsystems, Inc. in the United States, other countries, or both).

As a server, data processing system 100 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 100 may be a symmetric multiprocessor (SMP) system including a plurality of processors in processing unit 106. Alternatively, a single processor system may be employed.

instructions for the operating system, the object-oriented programming system, and applications or programs are located on storage devices, such as HDD 126, and may be loaded into main memory 108 for execution by processing unit 106. The processes for illustrative embodiments of the present invention may be performed by processing unit 106 using computer usable program code, which may be located in a memory such as, for example, main memory 108. ROM 124, or in one or more peripheral devices 126 and 130, for example.

A bus system, such as bus 138 or bus 140 as shown in FIG. 1, may be comprised of one or more buses. Of course, the bus system may be implemented using any type of communication fabric or architecture that provides for a transfer of data between different components or devices attached to the fabric or architecture. A communication unit, such as modem 122 or network adapter 112 of FIG. 1, may include one or more devices used to transmit and receive data, A memory may be, for example, main memory 108, ROM 124, or a cache such as found in NB/MCH 102 in FIG. 1.

Those of ordinary skill in the art will appreciate that the hardware in FIG. 1 may vary depending on the implementation. Other internal hardware or peripheral devices, such as flash memory, equivalent non-volatile memory, or optical disk drives and the like, may be used in addition to or in place of the hardware depicted in FIG. 1. Also, the processes of the illustrative embodiments may be applied to a multiprocessor data processing system without departing from the spirit and scope of the present invention.

Moreover, the data processing system 100 may take the form of any of a number of different data processing systems including client computing devices, server computing devices, a tablet computer, laptop computer, telephone or other communication device, a personal digital assistant (PDA), or the like. In some illustrative examples, data processing system 100 may be a portable computing device which is configured with flash memory to provide non-volatile memory for storing operating system files and/or user-generated data, for example. Essentially, data processing system 100 may be any known or later developed data processing system without architectural limitation.

With the data processing system 100 of FIG. 1, the processor 106 may have facilities for processing both integer and floating-point instructions and operating on both types of data. However, in accordance with the illustrative embodiments, the processor 106 may have hardware facilities for handling SIMD instructions and data as floating-point only SIMD instructions and data. The scalar facilities are used for integer processing, and in conjunction with the floating-point only SIMD architecture for inter alia loop control and memory access control.

Referring to FIG. 2, an exemplary block diagram of a dual-threaded processor core design showing functional units and registers is depicted in accordance with an illustrative embodiment. Processor core 200 may be implemented in a processor, such as processing unit 106 in FIG. 1, in these illustrative examples. Processor core 200 comprises a single integrated circuit superscalar microprocessor with dual-thread simultaneous multi-threading (SMT) that may also be operated in a single-threaded mode. Accordingly, as discussed further herein below, processor core 200 includes various units, registers, buffers, memories, and other sections, all of which are formed by integrated circuitry. Also, in an illustrative embodiment, processor core 200 operates according to reduced instruction set computer (RISC) techniques.

As shown in FIG. 2, instruction fetch unit (IFU) 202 connects to instruction cache 204. Instruction cache 204 holds instructions for multiple programs (threads) to be executed. Instruction cache 204 also has an interface to level 2 (L2) cache/memory 206. IFU 202 requests instructions from instruction cache 204 according to an instruction address, and passes instructions to instruction decode unit 208. In an illustrative embodiment, IFU 202 may request multiple instructions from instruction cache 204 for up to two threads at the same time. Instruction decode unit 208 decodes multiple instructions for one or more threads at the same time and passes decoded instructions to instruction sequencer unit (ISU) 209.

Processor core 200 may also include issue queue 210, which receives decoded instructions from ISU 209. Instructions are stored in the issue queue 210 while awaiting dispatch to the appropriate execution units. For an out-of order processor to operate in an in-order manner, ISU 209 may selectively issue instructions quickly using false dependencies between each instruction. if the instruction does not produce data, such as in a read after write dependency, ISU 209 may add an additional source operand (also referred to as a consumer) per instruction to point to the previous target instruction (also referred to as a producer). Issue queue 210, when issuing the producer, may then wakeup the consumer for issue. By introducing false dependencies, a chain of dependent instructions may then be created, whereas the instructions may then be issued only in-order. ISU 209 uses the added consumer for instruction scheduling purposes and the instructions, when executed, do not actually use the data from the added dependency. Once ISU 209 selectively adds any required false dependencies, then issue queue 210 takes over and issues the instructions in order for each thread, and outputs or issues instructions for each thread to execution units 212, 214, 216, 218, 220, 222, 224, 226, and 228 of the processor. This process will be described in more detail in the following description.

In an illustrative embodiment, the execution units of the processor may include branch unit 212, load/store units (LSUA) 214 and (LSUB) 216, fixed-point execution units (FXUA) 218 and (FXUB) 220, floating-point execution units (FPUA) 222 and (FPUB) 224, and vector multimedia extension units (VMXA) 226 and (VMXB) 228. Execution units 212, 214, 216, 218, 220, 222, 224, 226, and 228 are fully shared across both threads, meaning that execution units 212, 214, 216, 218, 220, 222, 224, 226, and 228 may receive instructions from either or both threads. The processor includes multiple register sets 230, 232, 234, 236, 238, 240, 242, 244, and 246, which may also be referred to as architected register files (ARFs).

An ARF is a file where completed data is stored once an instruction has completed execution. ARFs 230, 232, 234, 236, 238, 240, 242, 244, and 246 may store data separately for each of the two threads and by the type of instruction, namely general purpose registers (GPRs) 230 and 232, floating-point registers (FPRs) 234 and 236, special purpose registers (SPRs) 238 and 240, and vector registers (VRs) 244 and 246. Separately storing completed data by type and by thread assists in reducing processor contention while processing instructions.

The processor additionally includes a set of shared special purpose registers (SPR) 242 for holding program states, such as an instruction pointer, stack pointer, or processor status word, which may be used on instructions from either or both threads. Execution units 212, 214, 216, 218, 220, 222, 224, 226, and 228 are connected to ARFs 230, 232, 234, 236, 238, 240, 242, 244, and 246 through simplified internal bus structure 249.

in order to execute a floating-point instruction, FPUA 222 and FPUB 224 retrieves register source operand information, which is input data required to execute an instruction, from FPRs 234 and 236, if the instruction data required to execute the instruction is complete or if the data has passed the point of flushing in the pipeline. Complete data is data that has been generated by an execution unit once an instruction has completed execution and is stored in an ARF, such as ARFs 230, 232, 234, 236, 238, 240, 242, 244, and 246. incomplete data is data that has been generated during instruction execution where the instruction has not completed execution. FPUA 222 and FPUB 224 input their data according to which thread each executing instruction belongs to. For example, FPUA 222 inputs completed data to FPR 234 and FPUB 224 inputs completed data to FPR 236, because FPUA 222, FPUB 224, and FPRs 234 and 236 are thread specific.

During execution of an instruction, FPUA 222 and FPUB 224 output their destination register operand data, or instruction data generated during execution of the instruction, to FPRs 234 and 236 when the instruction has passed the point of flushing in the pipeline. During execution of an instruction, FXUA 218, FXUB 220, LSUA 214, and LSUB 216 output their destination register operand data, or instruction data generated during execution of the instruction, to GPRs 230 and 232 when the instruction has passed the point of flushing in the pipeline. During execution of a subset of instructions, FXUA 218, FXUB 220, and branch unit 212 output their destination register operand data to SPRs 238, 240, and 242 when the instruction has passed the point of flushing in the pipeline. Program states, such as an instruction pointer, stack pointer, or processor status word, stored in SPRs 238 and 240 indicate thread priority 252 to ISU 209. During execution of an instruction, VMXA 226 and VMXB 228 output their destination register operand data to VRs 244 and 246 when the instruction has passed the point of flushing in the pipeline.

Data cache 250 may also have associated with it a non-cacheable unit (not shown) which accepts data from the processor and writes it directly to level 2 cache/memory 206. In this way, the non-cacheable unit bypasses the coherency protocols required for storage to cache.

In response to the instructions input from instruction cache 204 and decoded by instruction decode unit 208, ISU 209 selectively dispatches the instructions to issue queue 210 and then onto execution units 212, 214, 216, 218, 220, 222, 224, 226, and 228 with regard to instruction type and thread, In turn, execution units 212, 214, 216, 218, 220, 222, 224, 226, and 228 execute one or more instructions of a particular class or type of instructions. For example, FXUA 218 and FXUB 220 execute fixed-point mathematical operations on register source operands, such as addition, subtraction, ANDing, ORing and XORing. FPUA 222 and FPUB 224 execute floating-point mathematical operations on register source operands, such as floating-point multiplication and division. LSUA 214 and LSUB 216 execute load and store instructions, which move operand data between data cache 250 and ARFs 230, 232, 234, and 236. VMXA 226 and VMXB 228 execute single instruction operations that include multiple data. Branch unit 212 executes branch instructions which conditionally alter the flow of execution through a program by modifying the instruction address used by IFU 202 to request instructions from instruction cache 204.

Instruction completion unit 254 monitors internal bus structure 249 to determine when instructions executing in execution units 212, 214, 216, 218, 220, 222, 224, 226, and 228 are finished writing their operand results to ARFs 230, 232, 234, 236, 238, 240, 242, 244, and 246. Instructions executed by branch unit 212, FXUA 218, FXUB 220, LSUA 214, and LSUB 216 require the same number of cycles to execute, while instructions executed by FPUA 222, FPUB 224, VMXA 226, and VMXB 228 require a variable, and a larger number of cycles to execute. Therefore, instructions that are grouped together and start executing at the same time do not necessarily finish executing at the same time. "Completion" of an instruction means that the instruction is finishing executing in one of execution units 212, 214, 216, 218, 220, 222, 224, 226, or 228, has passed the point of flushing, and all older instructions have already been updated in the architected state, since instructions have to be completed in order. Hence, the instruction is now ready to complete and update the architected state, which means updating the final state of the data as the instruction has been completed. The architected state can only be updated in order, that is, instructions have to be completed in order and the completed data has to be updated as each instruction completes.

Instruction completion unit 254 monitors for the completion of instructions, and sends control information 256 to ISU 209 to notify ISU 209 that more groups of instructions can be dispatched to execution units 212, 214, 216, 218, 220, 222, 224, 226, and 228. ISU 209 sends dispatch signal 258, which serves as a throttle to bring more instructions down the pipeline to the dispatch unit, to IFU 202 and instruction decode unit 208 to indicate that it is ready to receive more decoded instructions. While processor core 200 provides one detailed description of a single integrated circuit superscalar microprocessor with dual-thread simultaneous multi-threading (SMT) that may also be operated in a single-threaded mode, the illustrative embodiments are not limited to such microprocessors. That is, the illustrative embodiments may be implemented in any type of processor which provides multi-threaded operation, whether this be two simultaneous threads (SMT2), four simultaneous threads (SMT4), or more simultaneous threads.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system without departing from the spirit and scope of the present invention.

With regard to the illustrative embodiments, the data processing system consists of one or more processor cores, each having at least one hardware thread, where each of these hardware threads may run tasks independently of the other thread(s). In some cases, the hardware threads may compete among themselves for the available core resources, such as pipeline slots, queues, buffers, core's cache memory, and core's memory bandwidth. Such competition may degrade the applications' individual performances, although it may utilize the core resources to the maximum. In some cases, the data processing system may operate at reduced frequency and voltage levels, which in turn may reduce energy consumption. For example, a system with cores that allow dynamic voltage and frequency scaling (DVFS) may be operated in a manner to allow the data processing system to trade potentially lower performance in return for lower energy consumption by reducing the operating frequency and voltage. Processor cores operating at higher voltage and frequencies generally consume more power than operating at lower voltage and frequencies. Power consumption is a non-linear function of voltage and frequency. Thus, according to illustrative embodiments, using processor cores at lower frequencies may yield a good tradeoff between performance and energy consumption.

In the illustrative embodiments, a user application may run one or more tasks. Each task has associated with it a desired frequency $f_a$. Running the task at this frequency will likely yield the best tradeoff between performance and energy consumption. Deviating from this frequency may yield either negligible performance gain with much greater energy consumption, or negligible energy reduction with much lower performance. Each task also has a desired maximum number of competing threads $t_a$ that specifies the maximum number of threads that could be running on the core without seriously degrading the task's individual performance. The task's performance will likely degrade with increasing the number of threads running on the same core beyond $t_a$.

In one exemplary embodiment, a data processing system may include C processor cores, each capable of running T hardware threads. Each processor core may be set to run at a frequency chosen from a range of discrete frequencies $f_1, f_2, \ldots, f_m$ where $f_m$ designates the maximum frequency at which the processor core may function. The voltage of the processor core is adjusted with the frequency such that $f_1$ corresponds to operating at the minimum power consumption, while $f_m$ corresponds to operating at the maximum power consumption. A core frequency may be set to 0, in which case the core is idle and may be put to sleep to save energy.

Figure 3:
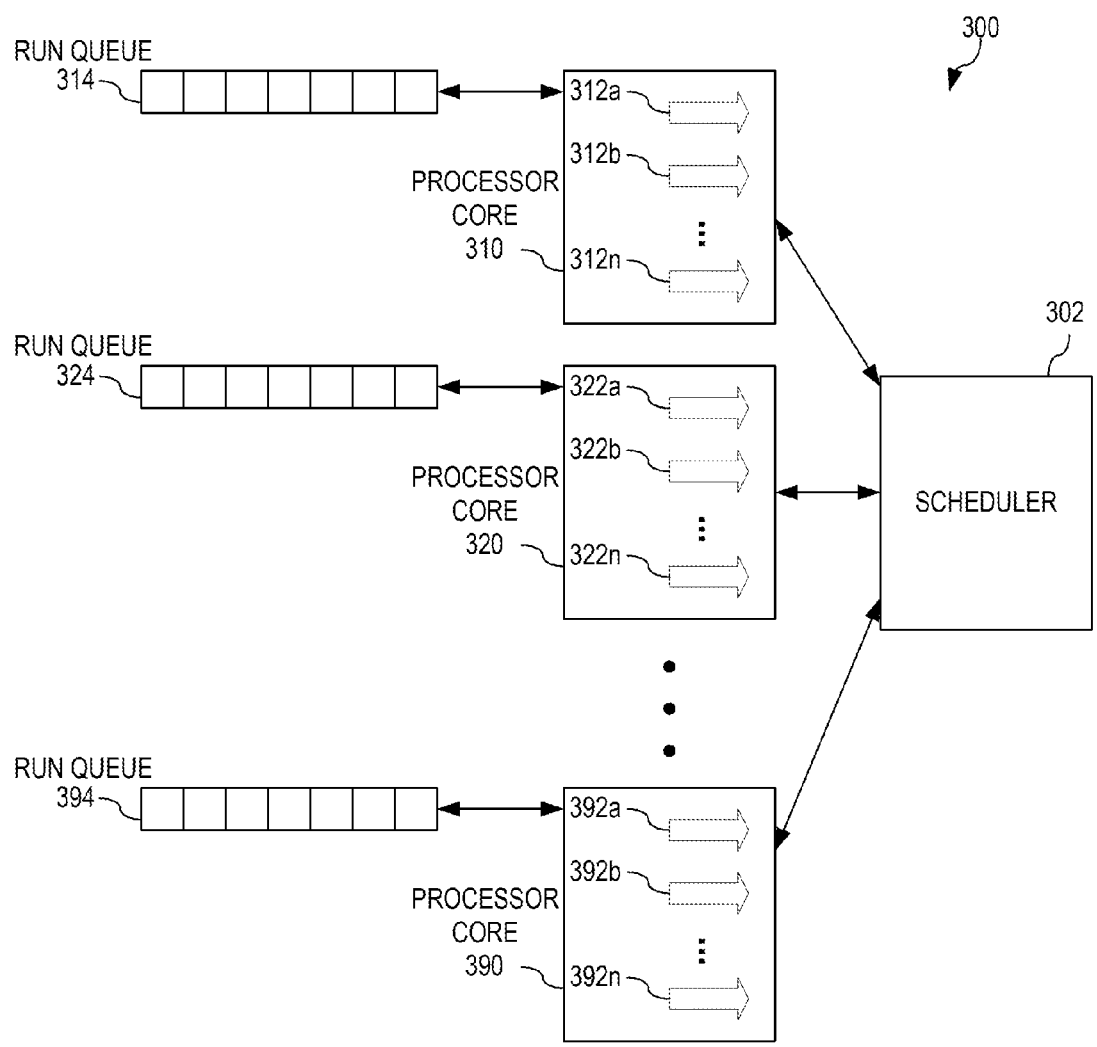
FIG. 3 depicts an exemplary data processing system with a plurality of processor cores in accordance with an illustrative embodiment.

Referring to FIG. 3, an exemplary data processing system is depicted with a plurality of processor cores in accordance with an illustrative embodiment. Data processing system 300 comprises scheduler 302 and processor cores 310, 320, . . . , 390. Processor cores 310-390 may be implemented on a single chip or may be implemented on various processor chips. Each of processor cores 310-390 has several hardware threads 312a-312n, 322a-322n, and 392a-392n, respectively. Each of hardware threads 312a-312n, 322a-322n, and 392a-392n may run application tasks independently, and each of hardware threads 312a-312n, 322a-322n, and 392a-392n has all resources needed to store the state of the software thread that is dispatched by the operating system to run on the hardware thread, such as that depicted in FIG. 2. Hardware threads 312a-312n, 322a-322n, and 392a-392n compete among themselves for the computational and communication resources available on the processor core. For example, they compete for the pipelines, data paths to caches, and overall communication bandwidth. Within a processor core, all hardware threads must run at the same frequency, and the system adjusts the processor core voltage corresponding to the chosen frequency such that the voltage level is sufficient to support the frequency. Also within data processing system 300 are run queues 314, 324, and 394 corresponding to processor cores 310, 320, and 390, respectively. Run queues 314, 324, and 394 are typically stored in the system memory and are managed by the operating system to ensure proper management of the processor cores 310-390.

In the illustrative embodiments, scheduler 302 may compute specific performance characteristics for each of run queues 314, 324, and 394. To express the size of the work that is queued in a particular one of run queues 314, 324, or 394, scheduler 302 divides the length of the nm queue by the number of active hardware threads on the respective one of processor cores 310, 320, or 390. This value, referred to as a load coefficient, gives an indication for the amount of waiting that tasks will experience according to queuing theory. For example, four tasks queued on a processor core that has two active hardware threads will experience more waiting on average than five tasks queued on a processor core that has three active hardware threads. Furthermore, scheduler 302 designates a threshold below which it is acceptable to add more tasks to the run queue. Scheduler 302 considers a processor core having a load coefficient at or below this threshold to not be overloaded, whereas scheduler 302 considers a processor core having a load coefficient above this threshold to be overloaded and does not considered the processor core as a candidate for admitting more tasks unless data processing system 300 is experiencing large overload conditions. The threshold may be a user-defined value that is workload-dependent, environment-dependent, or a product of any appropriately user-defined factors, such as desired response time, system utilization caps, or the like.

In order to determine the workload that may be executed by each processor core in a plurality of processor cores, scheduler 302 determines a set P of all processor cores not currently idle. Scheduler 302 then identifies a run queue length and a number of active hardware threads on each of processor cores. The number of active hardware threads on a particular processor core p may be less than the number of hardware threads available in the processor core. Next, for each processor core p in set P. scheduler 302 computes a load coefficient as the run queue length of the corresponding processor core p divided by the number of active hardware threads in that processor core p.

In order for scheduler 302 to admit a task when operating with a user preference designating performance as the main optimization criterion, scheduler 302 attempts to route the task to one of run queues 314, 324, or 394 that already has tasks that have identical or similar requirements in frequency and/or hardware thread competition. By having a run queue of similar requirements, the hardware threads of the corresponding processor core may be used effectively to match the requirements of the tasks in one of run queues 314, 324, or 394. Otherwise, one or more tasks will run without using their preferred settings. For example, if all tasks in a particular run queue all have different frequency requirements, then it will not be possible for the scheduler 302 to schedule more than one task at a time on the corresponding processor core while also honoring the requirements of the task. In order to avoid this problem, scheduler 302 steers tasks of similar requirements to a same run queue so that the tasks may be scheduled using their requested frequency and thread concurrency values, raising efficiency, utilization and performance.

In order to assign tasks with regard to performance, scheduler 302 receives a task that identifies a desired frequency $f_a$ and a desired maximum number of competing hardware threads $t_a$ Scheduler 302 examines all processor cores to see whether there is an idle processor core available. The reason of performing this test is to assign the task to an idle processor core if possible, as this will offer the best performance (recall that this process is for the case where the user indicates preference for performance, hence the performance bias). If scheduler 302 determines that an idle processor core is available, scheduler 302 adds the task to the run queue of the respective processor core, which in turn causes the processor core to run at the frequency desired by the task. Scheduler 302 then "labels" the processor core with the frequency and hardware thread competition requirements of the task. This will help scheduler 302 steer further tasks in that direction in the future.

If scheduler 302 determines that there are no idle processor cores, then scheduler 302 identifies a subset S of processor cores that have the smallest load coefficient as determined above. The goal here is to identify the least loaded processor core so that the newly introduced task will experience the minimum wait time on the run queue as desired by the performance bias of the user preference in this case. Scheduler 302 identifies a subset of set P that match the desired parameters of the task. This list includes processor cores that would be ideal to run the newly introduced task because of the match. If scheduler 302 identifies at least one processor core, then scheduler 302 assigns the task to one of the at least one processor core. However, if scheduler 302 determines that no processor core has the correct parameters (frequency and maximum number of hardware threads) that match the new task, then scheduler 302 identifies a subset of the subset S where at least the frequency of the processor core matches that of the task, although the active hardware threads may exceed the tolerance of the task. That is, absent a perfect match of the task parameters, scheduler 302 attempts to at least schedule the task on a processor core that matches the frequency requirements of the task, so that some level of efficiency in resource utilization is still achieved. If scheduler 302 identifies a processor core that has matching frequency requirements, then scheduler 302 adds the task to the run queue of the respective processor core.

If scheduler 302 fails to identify a processor core that has matching frequency requirements, scheduler 302 identifies a subset of the subset S that may have different frequency but at least have an active number of hardware threads that would be tolerated by the task. If scheduler 302 identifies a processor core that has a matching number of active hardware threads, then scheduler 302 adds the task to the run queue of the respective processor core. Scheduler 302 either directly adjusts or instructs another agent (not shown) to adjust the frequency of the processor core to match that of the highest frequency requested by tasks scheduled for that core. The goal of this step is to satisfy the user-bias toward performance, since some tasks are likely to have a preferred frequency that is lower than that of the task. If so, these tasks will run faster even if they may not need or may exploit the rise in frequency effectively. If scheduler 302 fails to identify a processor core that has matching frequency requirements or a matching number of active hardware threads, then the admission process has failed to find a suitable processor core that matches the desired frequency and the hardware thread competition tolerated by the new task. In this case, scheduler 302 chooses one of the processor cores in subset S (least loaded processor cores) to host the new task, and scheduler 302 either directly adjusts or instructs another agent not shown) to adjust the frequency of the processor core accordingly.

In order for scheduler 302 to admit a task when operating with a user preference designating the minimization of energy consumption as the main optimization criterion, scheduler 302 attempts to route the task to one of run queues 314, 324, or 394 that already has tasks that have identical or similar requirements in frequency and/or hardware thread competition. By having a run queue of similar requirements, the hardware threads of the corresponding processor core may be used effectively to match the requirements of the tasks in the run queue, In order to assign tasks with regard to minimization of energy consumption, scheduler 302 receives a task with a desired frequency $f_a$ and a desired maximum number of competing hardware threads $t_a$. Scheduler 302 determines a set of processor cores that currently have a workload below an overload threshold. Scheduler 302 performs this process to identify processor cores that would still give an acceptable level of performance for the new task. In contrast to the process performed based on performance, scheduler 302 attempts to keep as many processor cores as possible in the idle or sleep state in order to minimize energy consumption. If all active processor cores are currently overloaded, scheduler 302 examines a list of idle processor cores and schedules the task on a selected processor core if an at least one idle processor core is available. If scheduler 302 determines that an idle processor core is available, the operation system sets the frequency and the maximum number of active hardware threads for the processor core to match the requirements of the task.

However, if scheduler 302 determines that no idle processor core is available, scheduler 302 uses the set of all processor cores to determine the candidate pool for running the new task. Once scheduler 302 determines the candidate pool of overloaded processor cores or if scheduler 302 determines that there is a non-idle and not overloaded processor core, scheduler 302 searches to find a processor core that is running at a frequency and maximum active hardware threads that match the preferences of the task. If scheduler 302 identifies such a processor core, then scheduler 302 adds the task to the run queue of the respective processor core. This is the ideal condition for finding a suitable processor core for the task where the task will run at the desired frequency and desired maximum number of concurrent active hardware threads. If scheduler 302 fails to identify such a processor core, then scheduler 302 attempts to identify a set of processor cores that are currently running at a slower frequency than the task specifies. The goal here is to try to run the task within the energy cost that is at or lower than what would correspond to the ideal performance-energy product. If scheduler 302 identifies such a processor core, then scheduler 302 adds the task to the run queue of the respective processor core. If scheduler 302 fails to identify a processor core that is currently running at a slower frequency than what the task is looking for, scheduler 302 then attempts to identify a processor core that at least matches the hardware thread competition requirements. If scheduler 302 identifies a processor core that matches the hardware thread competition requirements, then scheduler 302 adds the task to the run queue of the respective processor core. If scheduler 302 fails to identify a processor core that matches the hardware thread competition requirements, then scheduler 302 chooses any available processor core to host the new task, and scheduler 302 either directly adjusts or instructs another agent (not shown) to adjust the frequency of the processor core accordingly.

The processes of admitting tasks based on an expressed preference of either maximizing performance or minimizing energy consumption are probabilistic in nature. Both processes constitute a best-effort attempt to steer newly admitted tasks to run queues that contain tasks that have similar frequency and hardware thread competition requirements. Ideally, the admission processes would be successful in doing that. However, there is no guarantee that this always be the case, and, for those aberrant cases, scheduler 302 may remedy the situation by performing the following operations after either of the admission processes complete.

In order to remedy an aberrant situation, scheduler 302 may decide an order for tasks in a given run queue. This process may be invoked periodically, such as upon a timer interrupt, when a new task is admitted to a run queue, or the like, or when an existing task is preempted or removed out of the data processing system to let another task run. For each processor core or for a set of processor cores, scheduler 302 de-schedules all currently active tasks which have been scheduled on the processor core's active hardware threads. Scheduler 302 sets the number of active hardware threads to 0. Scheduler 302 dispatches the task at the head of the run queue on the first hardware thread of the processor core. Scheduler 302 sets the operating frequency of the processor core to the frequency required by the task and scheduler 302 increases a number of active hardware threads by the required amount. Scheduler 302 then advances the pointer in the run queue to the next task. Scheduler 302 then performs a test to see: whether all tasks in the run queue have been examined, whether all hardware threads have now been allocated, whether the frequency desired by the next task in the run queue is different from the operating frequency previously set, and/or whether the number of hardware threads as desired by the next task is available.

That is, if scheduler 302 determines that there are additional tasks in the run queue, scheduler 302 then determines whether all hardware threads have been allocated. If scheduler 302 determines that all of the hardware threads have not been allocated, then scheduler 302 determines whether the frequency desired by the next task in the run queue is different from the operating frequency previously set. If scheduler 302 determines that the frequency of the next task is not different, then scheduler 302 dispatches the next task on a next hardware thread of the processor core, increases a number of active hardware threads by the required amount, advances the pointer in the run queue to the next task, and repeats the test. If scheduler 302 determines that the frequency of the next task is different, then scheduler 302 determines whether a number of hardware threads required by the next task are available. If scheduler 302 determines that there are the required number of active hardware threads, then scheduler 302 dispatches the next task on a next hardware thread of the processor core, increases a number of active hardware threads by the required amount, advances the pointer in the run queue forward, and repeats the test. If scheduler 302 determines that there are not the required number of active hardware threads, scheduler 302 waits for previous tasks to completed, then scheduler 302 repeats the test.

The first condition corresponds to the case when the processor core has been scheduled in full. The second condition corresponds to the case where the number of tasks in the run queue is less than or equal to the available hardware threads on the processor core. The third and fourth conditions correspond to the case where there are hardware threads on the run queue that do not have identical frequency or maximum number of competing hardware threads requirements, respectively. In this example, scheduler 302 honors the specification of each task. Other possible variations include setting the processor core at the minimum frequency of the currently scheduled batch of tasks in the case of user preference indicating energy consumption reduction, or the maximum frequency of the currently scheduled batch of tasks in the case of user preference indicating performance bias. Other variations also include relaxing the requirements on the number of competing hardware threads. These variations would allow more tasks to be scheduled simultaneously, which could improve throughput of the system but may affect the performance of certain tasks or exceed the desired level of energy consumption.

If for some reason a task is preempted out of data processing system 300 and the user preference indicates a performance bias, scheduler 302 removes the preempted task from the assigned processor core. Scheduler 302 then examines the run queue to determine whether there is at least one task whose frequency requirements are identical to those designated for the processor core. If scheduler 302 determines that there is not at least one task whose frequency requirements are identical to those designated for the processor core, then scheduler 302 sets the frequency of the processor core to the maximum frequency requirement among all the tasks that are currently in the run queue (consistent with the user preference having a performance bias).

If scheduler 302 determines that there is at least one task whose frequency requirements are identical to those designated for the processor core, then scheduler 302 leaves the processor core at the current frequency. Once scheduler 302 has set the frequency of the processor core to the maximum frequency requirement among all the tasks that are currently in the run queue or has decided to leave the processor core at the current frequency because there is at least one task whose frequency requirements are identical to those designated for the processor core, then scheduler 302 determines whether the maximum number of active hardware threads designated for the processor core is consistent with at least one task in the run queue. If scheduler 302 determines that the maximum number of active hardware threads designated for the processor core is not consistent with at least one task in the run queue, then scheduler 302 changes the maximum number of competing hardware threads designation to correspond to the strictest among the existing tasks on the run queue. If scheduler 302 determines that there is at least one task whose maximum number of active hardware threads is consistent with those designated for the processor core, then scheduler 302 leaves the processor core at the current number of active hardware threads.

Once scheduler 302 has changed the maximum number of competing hardware threads designation to correspond to the strictest among the existing tasks on the run queue or has decided to leave the processor core at the current number of active hardware threads because there is at least one task in the run queue whose maximum number of active hardware threads is consistent with those designated for the processor core, scheduler 302 attempts to perform load balancing among the active processor cores. Scheduler 302 determines whether there is another active processor core that is experiencing a longer run queue than the current processor core. If scheduler 302 determines that there is another active processor core experiencing a longer run queue than the current processor core, scheduler 302 determines whether there is a task in the run queue of the other active processor core whose frequency and hardware thread competition requirements match those of the current processor core. If scheduler 302 determines that there is at least one task in the run queue of the other active processor core whose frequency and hardware thread competition requirements match those of the current processor core, then scheduler 302 moves the task to the run queue of the current processor core.

If scheduler 302 determines that there is no task in the run queue of the other active processor core whose frequency and hardware thread competition requirements match those of the current processor core, then scheduler 302 determines whether there is at least one task that may be moved. If scheduler 302 determines that there is at least one task in the run queue of the other active processor core, scheduler 302 moves any one task of the at least one task to the run queue of the current processor core in order to decrease overloading of the other active processor core. If scheduler 302 determines that there is not at least one task in the run queue of the other active processor core, scheduler 302 performs one last check to determine whether the run queue of the current processor core is empty. If scheduler 302 determines that the run queue of the current processor core is not empty, then the operation repeats. If scheduler 302 determines that the run queue of the current processor core is empty, then scheduler 302 sets the processor core to idle (put to sleep) to save energy. This corresponds to the case in which the data processing system is lightly loaded, so scheduler 302 has preempted the only running task on the processor core, and where there are no other active processor cores that have higher workload than the current processor core (which corresponds to a condition of sparse load).

If for some reason a task is preempted out of data processing system 300 and the user preference indicates a bias toward better energy consumption, scheduler 302 removes the preempted task from the processor core. Scheduler 302 then determines whether the run queue of the current processor is empty. If scheduler 302 determines that the run queue of the current processor is not empty, then scheduler 302 examines the run queue to determine whether there is at least one task whose frequency requirements are identical to those designated for the processor core. If scheduler 302 determines that there is not at least one task whose frequency requirements are identical to those designated for the processor core, then scheduler 302 sets the frequency of the processor core to the minimum frequency requirement among all the tasks that are currently on the run queue (consistent with the user preference having a bias toward minimizing energy consumption).

If scheduler 302 determines that there is at least one task whose frequency requirements are identical to those designated for the processor core, then scheduler 302 leaves the processor core at the current frequency. Once scheduler 302 has set the frequency of the processor core to the minimum frequency requirement among all the tasks that are currently on the run queue or has decided to leave the processor core at the current frequency because there is at least one task whose frequency requirements are identical to those designated for the processor core, scheduler 302 then determines whether the maximum number of active hardware threads designated for the processor core is consistent with at least one task in the run queue. If scheduler 302 determines that the maximum number of active hardware threads designated for the processor core is not consistent with at least one task in the run queue, then scheduler 302 changes the maximum number of competing hardware threads designation to correspond to the strictest among the existing tasks on the run queue. If scheduler 302 determines that there is at least one task whose maximum number of active hardware threads is consistent with those designated for the processor core, then scheduler 302 leaves the processor core at the current number of active hardware threads.

Once scheduler 302 has changed the maximum number of competing hardware threads designation to correspond to the strictest among the existing tasks on the run queue or has decided to leave the processor core at the current number of active hardware threads because there is at least one task in the run queue whose maximum number of active hardware threads is consistent with those designated for the processor core, scheduler 302 attempts to perform load balancing among the active processor cores. Scheduler 302 determines whether there is another active processor core that is experiencing a longer run queue than the current processor core. If scheduler 302 determines that there is another active processor core experiencing a longer run queue than the current processor core, scheduler 302 determines whether there is a task in the run queue of the other active processor core whose frequency and hardware thread competition requirements match those of the current processor core. If scheduler 302 determines that there is at least one task in the run queue of the other active processor core whose frequency and hardware thread competition requirements match those of the current processor core, then scheduler 302 moves the task to the run queue of the current processor core.

If scheduler 302 determines that there is no task in the run queue of the other active processor core whose frequency and hardware thread competition requirements match those of the current processor core, then scheduler 302 determines whether there is at least one task that may be moved. If scheduler 302 determines that there is at least one task in the run queue of the other active processor core, scheduler 302 moves any one task of the at least one task to the run queue of the current processor core in order to decrease overloading of the other active processor core, If scheduler 302 determines that there is not at least one task in the run queue of the other active processor core, then the operation repeats. If there are no overloaded cores, due to the energy bias, any cores with no active tasks are put into the idle state.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing, More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 4:
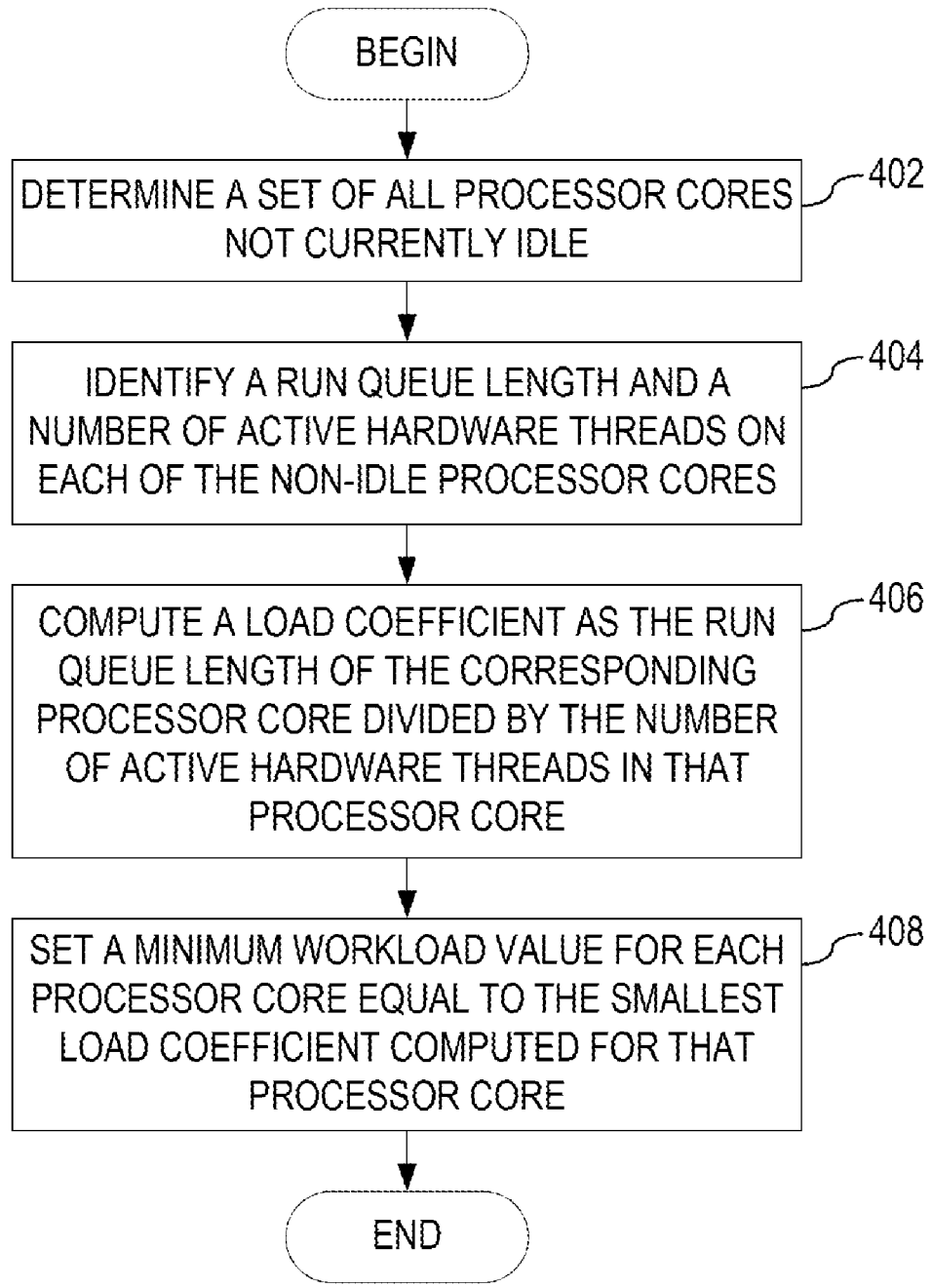
FIG. 4 depicts an exemplary operation performed by a scheduler in determining the workload that may be executed by each processor core in a plurality of processor cores in accordance with an illustrative embodiment.

Referring now to FIGS. 4-9, these figures provide flowcharts outlining example operations of scheduling application tasks while giving the best tradeoff possible among system throughput, application performance, and energy consumption. FIG. 4 depicts an exemplary operation performed by a scheduler in determining the workload that may be executed by each processor core in a plurality of processor cores in accordance with an illustrative embodiment. As the operation begins, the scheduler determines a set of all processor cores not currently idle (step 402). The scheduler identifies a run queue length and a number of active hardware threads on each of the non-idle processor cores (step 404). For each processor core in the set of non-idle processor cores, the scheduler computes a load coefficient as the run queue length of the corresponding processor core divided by the number of active hardware threads in that processor core (step 406). The scheduler then sets a minimum workload value for each processor core equal to the smallest load coefficient computed for that processor core (step 408), with the operation ending thereafter.

Figure 5:
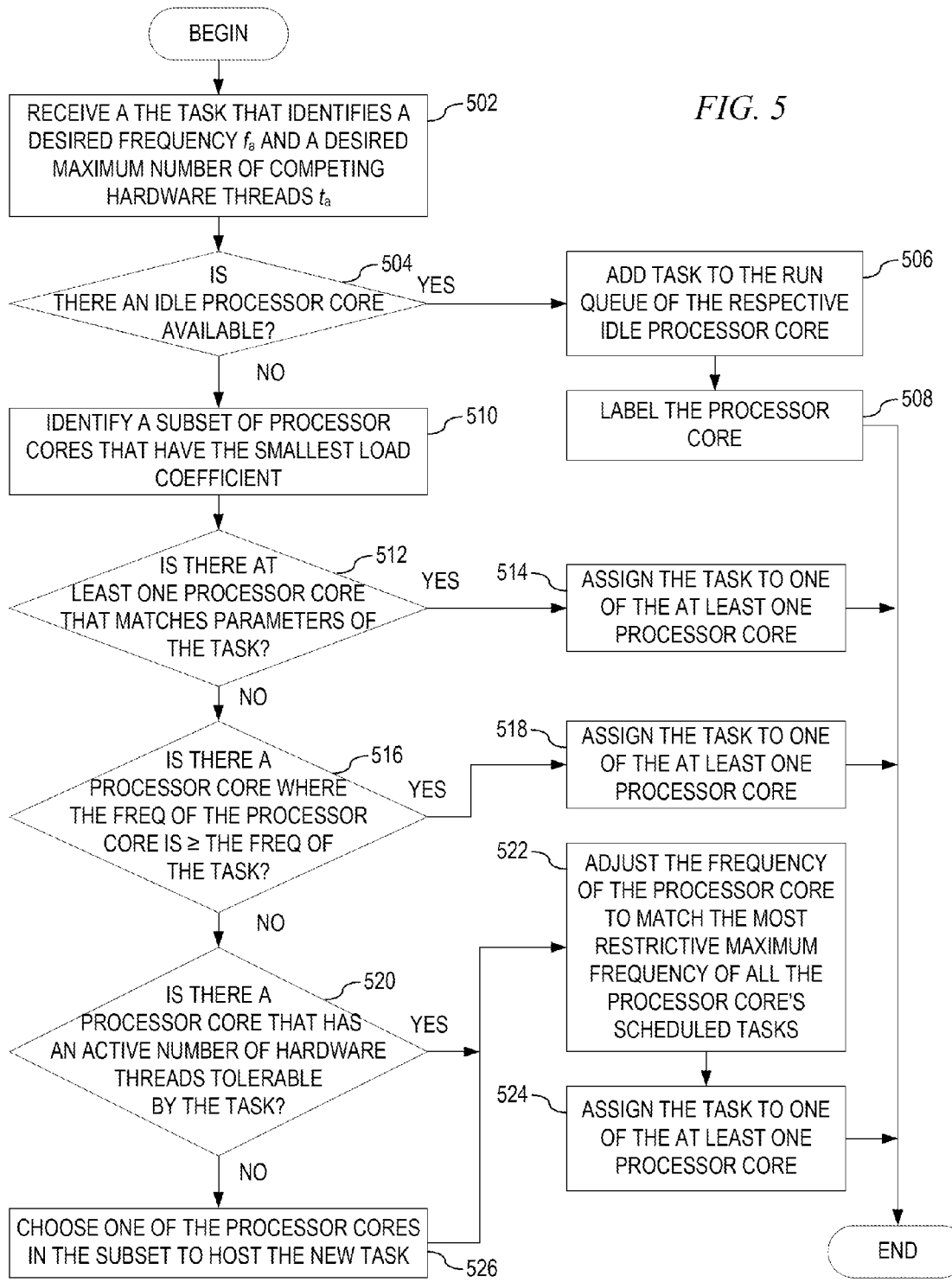
FIG. 5 depicts an exemplary operation performed by a scheduler in admitting a task when operating with a user preference designating performance as the main optimization criterion in accordance with an illustrative embodiment.

FIG. 5 depicts an exemplary operation performed by a scheduler in admitting a task when operating with a user preference designating performance as the main optimization criterion in accordance with an illustrative embodiment. As the operation begins, the scheduler receives a task that identifies a desired frequency $f_a$ and a desired maximum number of competing hardware threads $t_a$ (step 502). The scheduler examines all processor cores to see whether there is an idle processor core available (step 504). If at step 504 the scheduler determines that an idle processor core is available, then the scheduler adds the task to the run queue of the respective idle processor core, which in turn causes the processor core to become active and run at the frequency $f_a$ desired by the task (step 506). The scheduler then labels the processor core with the frequency and hardware thread competition requirements of the task (step 508), with the operation ending thereafter.

If at step 504 the scheduler determines that there are no idle processor cores, then the scheduler identifies a subset of processor cores that have the smallest load coefficient (step 510). Of that subset, the scheduler determines whether there is at least one processor core that matches the desired parameters of the task (step 512). If at step 512 the scheduler determines that there is at least one processor core in the subset, then the scheduler assigns the task to one of the at least one processor core (step 514), with the operation ending thereafter. if at step 512 the scheduler determines that no processor core that has current parameters that match the new task, then the scheduler determines whether there is at least one processor in the subset of processor cores where at least the frequency of the processor core is greater than or equal to the frequency of the task (step 516). If at step 516 the scheduler determines that there is at least one processor core that has acceptable frequency requirements, then the scheduler adds the task to the run queue of the respective processor core (step 518), with the operation ending thereafter.

If at step 516 the scheduler fails to identify a processor core that has matching frequency requirements, the scheduler determines whether there is a processor core in the subset that has a different frequency but has at least an active number of hardware threads that would be tolerated by the task (step 520). If at step 520 the scheduler identifies at least one processor core that has a matching number of active hardware threads, then the scheduler then either directly adjusts or instructs another agent (not shown) to adjust the frequency of the processor core to match the most restrictive maximum frequency of all the processor core's scheduled tasks, if the previous frequency of the processor core is not sufficient (step 522). The scheduler then adds the task to the run queue of the respective processor core (step 524), with the operation ending thereafter, If at step 520 the scheduler fails to identify at least one processor core that has matching frequency requirements or a matching number of active hardware threads, then the scheduler chooses one of the processor cores in the subset to host the new task (step 526), with the operation proceeding to step 522 thereafter.

Figure 6:
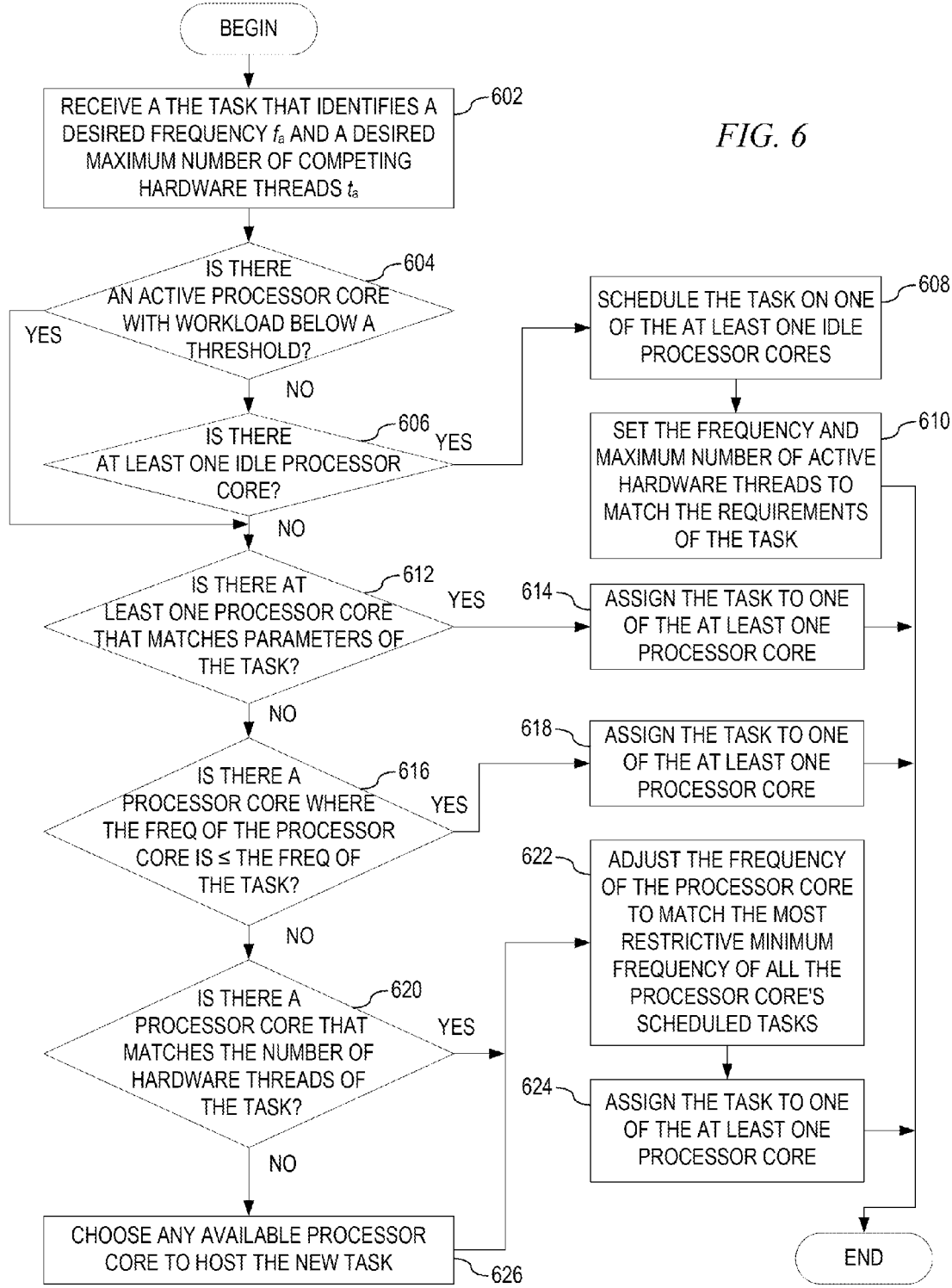
FIG. 6 depicts an exemplary operation performed by a scheduler in admitting a task when operating with a user preference designating the minimization of energy consumption as the main optimization criterion in accordance with an illustrative embodiment.

FIG. 6 depicts an exemplary operation performed by a scheduler in admitting a task when operating with a user preference designating the minimization of energy consumption as the main optimization criterion in accordance with an illustrative embodiment. As the operation begins, the scheduler receives a task with a desired frequency $f_d$ and a desired maximum number of competing hardware threads $t_a$ (step 602). The scheduler then determines whether there are any active processor cores that currently have a workload below an overload threshold (step 604). If at step 604 there are no active processor cores that are not overloaded, then the scheduler determines whether there is at least one idle processor (step 606). If at step 606 the scheduler determines that there is at least one idle processor core, the scheduler schedules the task on one of the at least one idle processor cores (step 608). The scheduler then sets the frequency and the maximum number of active hardware threads for the processor core to match the requirements of the task (step 610), with the operation ending thereafter.

If at step 606 the scheduler determines that no idle processor core is available or if at step 604 there are active processor cores that are not overloaded, the scheduler determines whether there is at least one processor core in all the processor cores running at a frequency and maximum active hardware threads that match the preferences of the task (step 612). If at step 612 the scheduler identifies such a processor core, then the scheduler adds the task to the run queue of the respective processor core (step 614), with the operation ending thereafter. If at step 612 the scheduler fails to identify at least one processor core in all the processor cores running at a frequency and maximum active hardware threads that match the preferences of the task, then the scheduler determines whether there is at least one processor in the subset of processor cores where at least the frequency of the processor core is less than (slower) or equal to than the frequency of the task (step 616). If at step 616 the scheduler identifies a processor core running at a slower frequency, then the scheduler adds the task to the run queue of the respective processor core (step 618), with the operation ending thereafter.

If at step 616 the scheduler fails to identify a processor core that is currently running at an acceptable frequency, the scheduler determines whether there is at least one processor core that at least matches the hardware thread competition requirements (step 620). If at step 620 the scheduler identifies at least one processor core that matches the hardware thread competition requirements, then the scheduler either directly adjusts or instructs another agent (not shown) to adjust the frequency of the processor core to match the most restrictive minimum frequency of all the processor core's scheduled tasks accordingly (step 622). The scheduler then adds the task to the run queue of the respective processor core (step 624), with the operation ending thereafter. If at step 620 the scheduler fails to identify a processor core that matches the hardware thread competition requirements, then the scheduler chooses any available processor core to host the new task (step 626), with the operation proceeding to step 622 thereafter.

Figure 7:
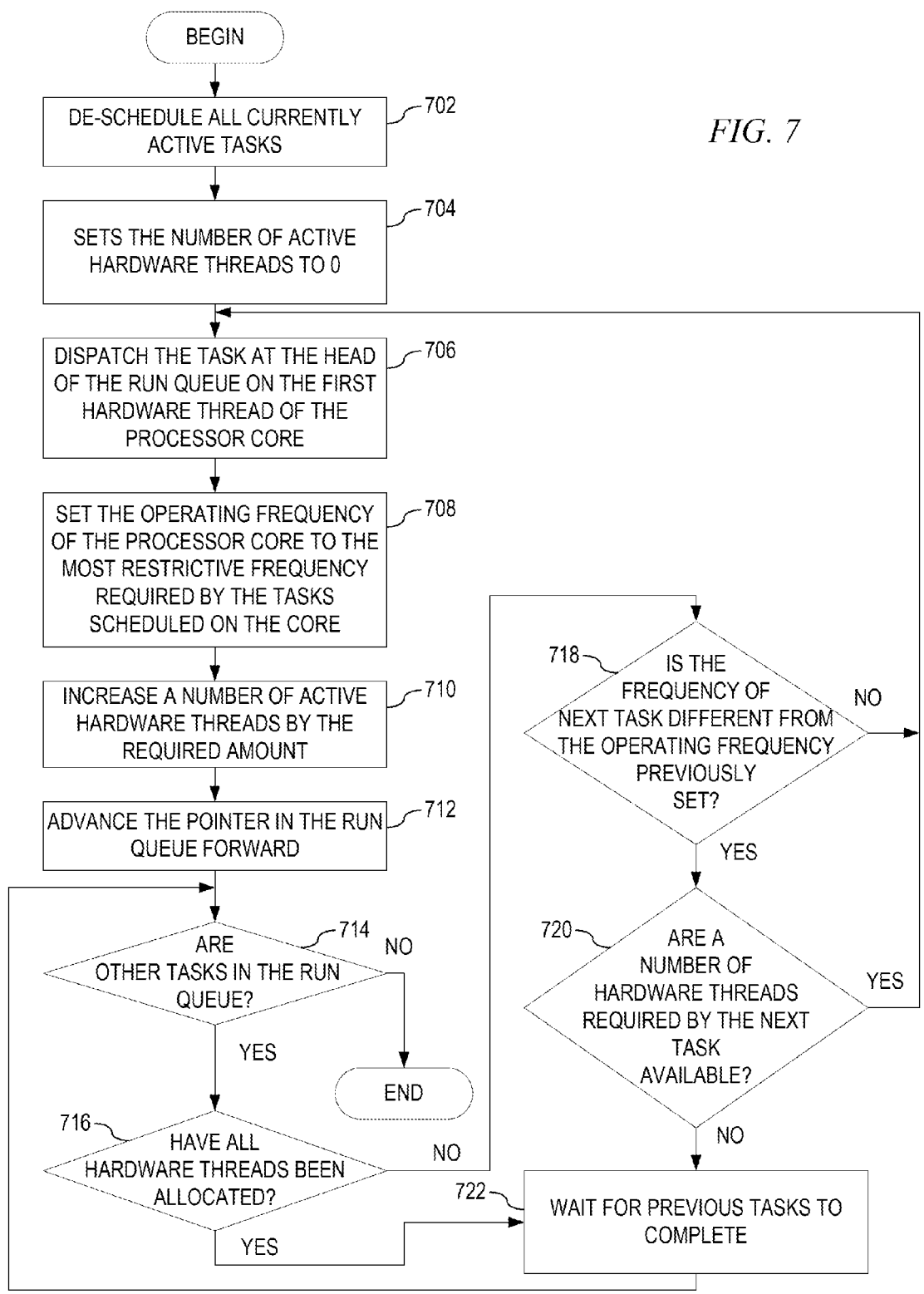
FIG. 7 depicts an exemplary operation performed by a scheduler in re-dispatching tasks on a run queue in accordance with an illustrative embodiment.

FIG. 7 depicts an exemplary operation performed by a scheduler in re-dispatching tasks on a run queue in accordance with an illustrative embodiment. As the operation begins, the scheduler de-schedules all currently active tasks that have been scheduled on the processor core's active hardware threads (step 702). The scheduler sets the number of active hardware threads to 0 (step 704). The scheduler dispatches the task at the head of the run queue on the first hardware thread of the processor core (step 706). The scheduler sets the operating frequency of the processor core to the most restrictive frequency required by the tasks scheduled on the core (step 708). The scheduler then increases a number of active hardware threads by the required amount (step 710) and advances the pointer in the run queue forward (step 712).

The scheduler determines whether there are other tasks in the run queue (step 714). If at step 714 the scheduler determines that there are no additional tasks in the run queue, the operation ends. If at step 714 the scheduler determines there are other tasks in the run queue, then the scheduler determines whether all hardware threads have been allocated (step 716). If at step 716 the scheduler determines that all hardware threads have not been allocated, the scheduler determines whether the frequency desired by the next task in the run queue is different from the operating frequency previously set (step 718). If at step 718 the scheduler determines that the frequency of the next task is not different, then the operation returns to step 706. If at step 718 the scheduler determines that the frequency of the next task is different, then the scheduler determines whether a number of hardware threads required by the next task are available (step 720). If at step 720 the scheduler determines that there are the required number of active hardware threads, then scheduler dispatches the task and the operation returns to step 706. If at step 720 the scheduler determines that there are not the required number of active hardware threads or if at step 716 the scheduler determines that all hardware threads have been allocated, the scheduler waits for previous tasks to completed (step 722), with the operation returning to step 714 thereafter.

Figure 8:
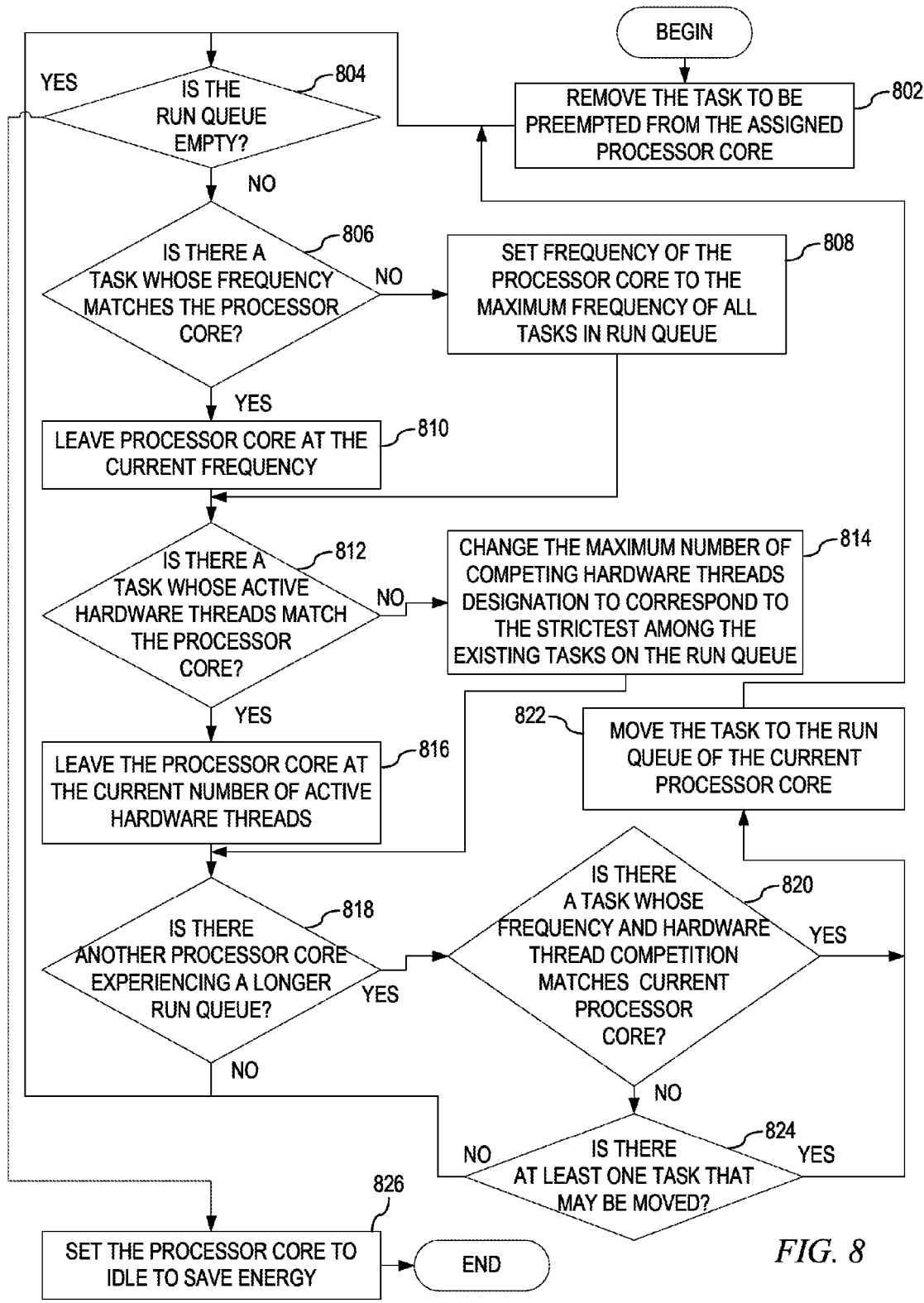
FIG. 8 depicts an exemplary operation performed by a scheduler in preempting a task out of a data processing system when the user preference indicates a performance bias in accordance with an illustrative embodiment.

FIG. 8 depicts an exemplary operation performed by a scheduler in preempting a task out of a data processing system when the user preference indicates a performance bias in accordance with an illustrative embodiment. As the operation begins, the scheduler removes the task to be preempted from the assigned processor core (step 802). The scheduler determines whether the run queue is empty (step 804). If at step 804 the scheduler determines that the run queue is not empty, then the scheduler determines whether there is at least one task in the run queue whose frequency requirements are identical to those designated for the processor core (step 806). If at step 806 the scheduler determines that there is not at least one task whose frequency requirements are identical to those designated for the processor core, then the scheduler sets the frequency of the processor core to the maximum frequency requirement among all the tasks that are currently on the run queue (step 808), which is consistent with the user preference having a performance bias.

If at step 806 the scheduler determines that there is at least one task whose frequency requirements are identical to those designated for the processor core, then the scheduler leaves the processor core at the current frequency (step 810). From steps 808 or 810, the scheduler determines whether the maximum number of active hardware threads designated for the processor core is consistent with at least one task in the run queue (step 812). If at step 812 the scheduler determines that the maximum number of active hardware threads designated for the processor core is not consistent with at least one task in the run queue, then the scheduler changes the maximum number of competing hardware threads designation to correspond to the strictest among the existing tasks on the run queue (step 814). If at step 812 the scheduler determines that there is at least one task whose maximum number of active hardware threads is consistent with those designated for the processor core, then the scheduler leaves the processor core at the current number of active hardware threads (step 816).

From steps 814 or 816, the scheduler attempts to perform load balancing among the active processor cores by determining whether there is another active processor core that is experiencing a longer run queue than the current processor core (step 818). If at step 818 the scheduler determines that there is another active processor core experiencing a longer run queue than the current processor core, the scheduler determines whether there is a task in the run queue of the other active processor core whose frequency and hardware thread competition requirements match those of the current processor core (step 820). If at step 820 the scheduler determines that there is at least one a task in the run queue of the other active processor core whose frequency and hardware thread competition requirements match those of the current processor core, then the scheduler moves the task to the run queue of the current processor core (step 822), with the operation returning to step 804 thereafter. If at step 820 the scheduler determines that there is no task in the run queue of the other active processor core whose frequency and hardware thread competition requirements match those of the current processor core, then the scheduler determines whether there is at least one task that may be moved (step 824). If at step 824 the scheduler determines that there is at least one task in the run queue of the other active processor core, then the scheduler moves the task to the run queue of the current processor core (step 822), with the operation returning to step 804 thereafter. If at step 824 the scheduler determines that there is not at least one task in the run queue of the other active processor core or if at step 818 the scheduler determines that there is not another active processor core experiencing a longer run queue than the current processor core, then the operation returns to step 804. If at step 804 the scheduler determines that the run queue of the current processor core is empty, then the scheduler sets the processor core to idle to save energy (step 826), with the operation ending thereafter.

Figure 9:
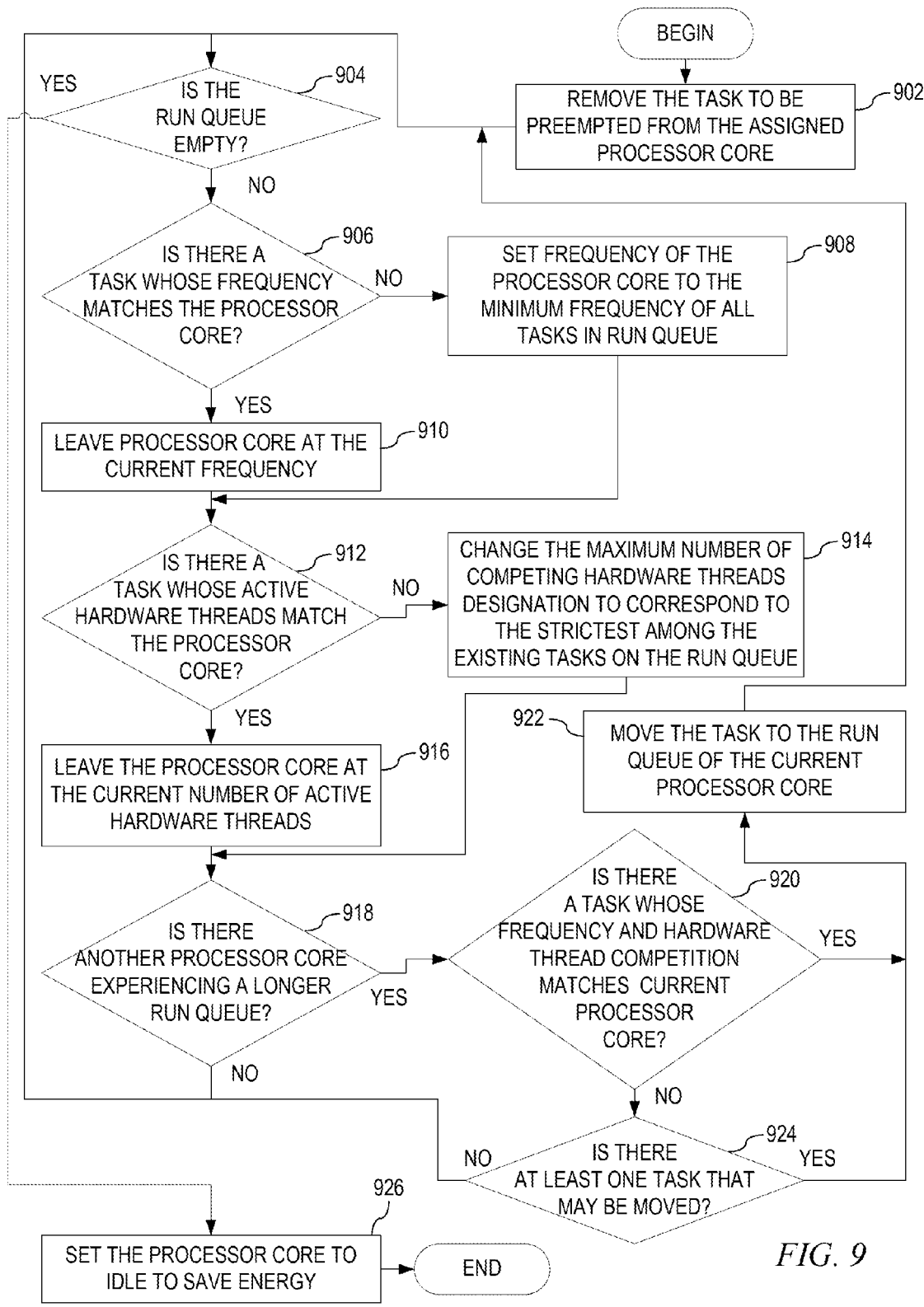
FIG. 9 depicts an exemplary operation performed by a scheduler in preempting a task out of a data processing system when the user preference indicates a bias toward better energy consumption in accordance with an illustrative embodiment.

FIG. 9 depicts an exemplary operation performed by a scheduler in preempting a task out of a data processing system when the user preference indicates a bias toward better energy consumption in accordance with an illustrative embodiment. As the operation begins, the scheduler removes the preempted task from the processor core (step 902). The scheduler then determines whether the run queue of the current processor is empty (step 904), If at step 904 the scheduler determines that the run queue of the current processor is not empty, then the scheduler determines whether there is at least one task in the run queue whose frequency requirements are identical to those designated for the processor core (step 906). If at step 906 the scheduler determines that there is not at least one task whose frequency requirements are identical to those designated for the processor core, then the scheduler sets the frequency of the processor core to the minimum frequency requirement among all the tasks that are currently on the run queue (step 908), which is consistent with the user preference having a bias toward minimizing energy consumption.

If at step 906 the scheduler determines that there is at least one task whose frequency requirements are identical to those designated for the processor core, then the scheduler leaves the processor core at the current frequency (step 910), From steps 908 or 910, the scheduler determines whether the maximum number of active hardware threads designated for the processor core is consistent with at least one task in the run queue (step 912). If at step 912 the scheduler determines that the maximum number of active hardware threads designated for the processor core is not consistent with at least one task in the run queue, then the scheduler changes the maximum number of competing hardware threads designation to correspond to the strictest among the existing tasks on the run queue (step 914). If at step 912 the scheduler determines that there is at least one task whose maximum number of active hardware threads is consistent with those designated for the processor core, then the scheduler leaves the processor core at the current number of active hardware threads (step 916).

From steps 914 or 916, the scheduler attempts to perform load balancing among the active processor cores by determining whether there is another active processor core that is experiencing a longer run queue than the current processor core (step 918). If at step 918 the scheduler determines that there is another active processor core experiencing a longer run queue than the current processor core, the scheduler determines whether there is a task in the run queue of the other active processor core whose frequency and hardware thread competition requirements match those of the current processor core (step 920). If at step 920 the scheduler determines that there is at least one a task in the run queue of the other active processor core whose frequency and hardware thread competition requirements match those of the current processor core, then the scheduler moves the task to the run queue of the current processor core (step 922).

If at step 920 the scheduler determines that there is no task in the run queue of the other active processor core whose frequency and hardware thread competition requirements match those of the current processor core, then the scheduler determines whether there is at least one task that may be moved (step 924). If at step 924 the scheduler determines that there is at least one task in the run queue of the other active processor core, then the scheduler moves the task to the run queue of the current processor core (step 922). If at step 924 the scheduler determines that there is not at least one task in the run queue of the other active processor core or if at step 918 the scheduler determines that there is not another active processor core experiencing a longer run queue than the current processor core, then the operation returns to step 904. If at step 904 the scheduler determines that the run queue of the current processor core is empty, then the scheduler sets the processor core to idle to save energy (step 926), with the operation ending thereafter.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for scheduling application tasks while giving the best tradeoff possible among system throughput, application performance, and energy consumption.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a non-transitory computer readable storage medium having a computer readable program stored therein, wherein the computer readable program, when executed on a computing device, causes the computing device to:

receive a task that identifies a desired frequency and a desired maximum number of competing hardware threads;

determine whether a user preference designates either maximization of performance or minimization of energy consumption;

responsive to the user preference designating the performance, determine whether there is an idle processor core in a plurality of processor cores available;

responsive to no idle processor being available, identify a subset of processor cores having a smallest load coefficient;

from the subset of processor cores, determine whether there is at least one processor core that matches desired parameters of the task; and responsive to at least one processor core matching the desired parameters of the task, assign the task to one of the at least one processor core that matches the desired parameters.

2. The computer program product of claim 1, wherein the computer readable program further causes the computing device to:

responsive to the at least one processor core failing to match the desired parameters of the task, determine whether there is at least one processor core in the subset of processor cores whose operating frequency either matches or is no worse than a desired frequency of the task; and responsive to identifying at least one processor core matching or is not worse than the desired frequency of the task, assign the task to one of the at least one processor core that matches or is no worse than the desired frequency.

3. The computer program product of claim 2, wherein the computer readable program further causes the computing device to:

responsive to the at least one processor core failing to match the desired frequency of the task, determine whether there is at least one processor core in the subset of processor cores that has a different frequency but has at least an active number of hardware threads that would be tolerated by the task;

responsive to at least one processor core having at least the number of active hardware threads that would be tolerated by the task, assign the task to one of the at least one processor core that has at least the active number of hardware threads that would be tolerated by the task;

adjust the operating frequency of the one of the at least one processor core that has at least the active number of hardware threads that would be tolerated by the task to match the expressed preference of performance or power bias; and responsive to at least one processor core failing to have at least the active number of hardware threads that would be tolerated by the task, assign the task to any processor core in the subset of processor cores.

4. The computer program product of claim 1, wherein the computer readable program further causes the computing device to:

responsive to the idle processor being available, assign the task to the idle processor core;

adjust the operating frequency of the idle processor core to the desired frequency of the task; and label the idle processor core with a frequency and hardware thread competition requirements of the task.

5. The computer program product of claim 1, wherein the computer readable program further causes the computing device to:

responsive to the user preference designating the minimization of energy consumption, determine whether there are any active processor cores that currently have a workload below an overload threshold;

responsive to failing to identify an active processor core that is not overloaded, determine whether there is an idle processor core in a plurality of processor cores available;

responsive to the idle processor being available, assign the task to the idle processor core;

adjust the operating frequency of the idle processor core to the desired frequency of the task; and label the idle processor core with a frequency and hardware thread competition requirements of the task.

6. The computer program product of claim 5, wherein the computer readable program further causes the computing device to:

responsive to no idle processor being available or responsive to identifying at least one active processor core that is not overloaded, determine whether there is at least one processor core in the plurality of processor cores that matches desired parameters of the task; and responsive to at least one processor core matching the desired parameters of the task, assign the task to one of the at least one processor core that matches the desired parameters.

7. The computer program product of claim 6, wherein the computer readable program further causes the computing device to:

responsive to the at least one processor core failing to match the desired parameters of the task, determine whether there is at least one processor core in the plurality of processor cores that is currently running at a slower frequency than a desired frequency of the task; and responsive to identifying at least one processor core currently running at the slower frequency than the desired frequency of the task, assign the task to one of the at least one processor core that is currently running at the slower frequency than the desired frequency of the task.

8. The computer program product of claim 7, wherein the computer readable program further causes the computing device to:

responsive to the at least one processor core failing to run at the slower frequency than a desired frequency of the task, determine whether there is at least one processor core in the plurality of processor cores that matches a number of hardware threads desired by the task;

responsive to at least one processor core matching the number of hardware threads desired by the task, assign the task to one of the at least one processor core that matches the number of hardware threads desired by the task;

adjust the operating frequency of the one of the at least one processor core that matches the number of hardware threads desired by the task to match the desired frequency of the task; and responsive to at least one processor core failing to match the number of hardware threads desired by the task, assign the task to any processor core in the subset of processor cores.

9. An apparatus, comprising:
a processor; and
a memory coupled to the processor, wherein the memory comprises instructions which, when executed by the processor, cause the processor to:

receive a task that identifies a desired frequency and a desired maximum number of competing hardware threads;

determine whether a user preference designates either maximization of performance or minimization of energy consumption;

responsive to the user preference designating the performance, determine whether there is an idle processor core in a plurality of processor cores available;

responsive to no idle processor being available, identify a subset of processor cores having a smallest load coefficient;

from the subset of processor cores, determine whether there is at least one processor core that matches desired parameters of the task; and responsive to at least one processor core matching the desired parameters of the task, assign the task to one of the at least one processor core that matches the desired parameters.

10. The apparatus of claim 9, wherein the instructions further cause the processor to:

responsive to the at least one processor core failing to match the desired parameters of the task, determine whether there is at least one processor core in the subset of processor cores whose operating frequency either matches or is no worse than a desired frequency of the task; and responsive to identifying at least one processor core matching or is not worse than the desired frequency of the task, assign the task to one of the at least one processor core that matches or is no worse than the desired frequency.

11. The apparatus of claim 10, wherein the instructions further cause the processor to:

responsive to the at least one processor core failing to match the desired frequency of the task, determine whether there is at least one processor core in the subset of processor cores that has a different frequency but has at least an active number of hardware threads that would be tolerated by the task;

responsive to at least one processor core having at least the number of active hardware threads that would be tolerated by the task, assign the task to one of the at least one processor core that has at least the active number of hardware threads that would be tolerated by the task;

adjust the operating frequency of the one of the at least one processor core that has at least the active number of hardware threads that would be tolerated by the task to match the expressed preference of performance or power bias; and responsive to at least one processor core failing to have at least the active number of hardware threads that would be tolerated by the task, assign the task to any processor core in the subset of processor cores.

12. The apparatus of claim 9, wherein the instructions further cause the processor to:

responsive to the idle processor being available, assign the task to the idle processor core;

adjust the operating frequency of the idle processor core to the desired frequency of the task; and label the idle processor core with a frequency and hardware thread competition requirements of the task.

13. The apparatus of claim 9, wherein the instructions further cause the processor to:

responsive to the user preference designating the minimization of energy consumption, determine whether there are any active processor cores that currently have a workload below an overload threshold;

responsive to failing to identify an active processor core that is not overloaded, determine whether there is an idle processor core in a plurality of processor cores available;

responsive to the idle processor being available, assign the task to the idle processor core;

adjust the operating frequency of the idle processor core to the desired frequency of the task; and label the idle processor core with a frequency and hardware thread competition requirements of the task.

14. The apparatus of claim 13, wherein the instructions further cause the processor to:

responsive to no idle processor being available or responsive to identifying at least one active processor core that is not overloaded, determine whether there is at least one processor core in the plurality of processor cores that matches desired parameters of the task; and responsive to at least one processor core matching the desired parameters of the task, assign the task to one of the at least one processor core that matches the desired parameters.

15. The apparatus of claim 14, wherein the instructions further cause the processor to:

responsive to the at least one processor core failing to match the desired parameters of the task, determine whether there is at least one processor core in the plurality of processor cores that is currently running at a slower frequency than a desired frequency of the task; and responsive to identifying at least one processor core currently running at the slower frequency than the desired frequency of the task, assign the task to one of the at least one processor core that is currently running at the slower frequency than the desired frequency of the task.

16. The apparatus of claim 15, wherein the instructions further cause the processor to:

responsive to the at least one processor core failing to run at the slower frequency than a desired frequency of the task, determine whether there is at least one processor core in the plurality of processor cores that matches a number of hardware threads desired by the task;

responsive to at least one processor core matching the number of hardware threads desired by the task, assign the task to one of the at least one processor core that matches the number of hardware threads desired by the task;

adjust the operating frequency of the one of the at least one processor core that matches the number of hardware threads desired by the task to match the desired frequency of the task; and responsive to at least one processor core failing to match the number of hardware threads desired by the task, assign the task to any processor core in the subset of processor cores.

* * * * *